US012773887B2

(12) United States Patent
Graves et al.

(10) Patent No.: US 12,773,887 B2
(45) Date of Patent: Oct. 27, 2026

(54) DYNAMICALLY TUNABLE COMBINATION REACTIVE-PROACTIVE CONTROLLER

(71) Applicant: ClearMotion, Inc., Billerica, MA (US)

(72) Inventors: William Graves, Somerville, MA (US); Marco Giovanardi, Melrose, MA (US); Yu Jiang, Wellesley, MA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 18/837,668

(22) PCT Filed: Feb. 13, 2023

(86) PCT No.: PCT/US2023/012921
§ 371 (c)(1),
(2) Date: Aug. 12, 2024

(87) PCT Pub. No.: WO2023/154513
PCT Pub. Date: Aug. 17, 2023

(65) Prior Publication Data

US 2025/0144967 A1 May 8, 2025

Related U.S. Application Data

(60) Provisional application No. 63/309,723, filed on Feb. 14, 2022.

(51) Int. Cl.
*B60G 17/0165* (2006.01)

(52) U.S. Cl.
CPC ...... *B60G 17/0165* (2013.01); *B60G 2400/82* (2013.01)

(58) Field of Classification Search
CPC ........................ B60G 17/0165; B60G 2400/82
(Continued)

(56) References Cited

U.S. PATENT DOCUMENTS 4,657,280 A * 4/1987 Ohmori .............. B60G 17/0165 280/124.108
4,674,767 A * 6/1987 Kuroki ............... B60G 17/0165 280/5.513
(Continued)

FOREIGN PATENT DOCUMENTS

DE 102008032545 A1 1/2010
DE 102014223475 A1 5/2016
(Continued)

OTHER PUBLICATIONS

International Search Report and Written Opinion for International Application No. PCT/US2023/012921 mailed May 9, 2023.
(Continued)

*Primary Examiner* — Kurt Philip Liethen
*Assistant Examiner* — John D Bailey
(74) *Attorney, Agent, or Firm* — Wolf, Greenfield & Sacks, P.C.

(57) ABSTRACT

Combination reactive-proactive controllers and their use are described herein. In a first mode of operation, such controllers may rely simultaneously both a priori information about a road surface ahead of the vehicle obtained from a data base and real time information collected by one or more on-board sensors. Alternatively, in a second mode, such controllers may rely only on real time information collected by one or more on-board sensors. Systems controlled by such controllers may include, but are not limited to, active suspension actuators.

42 Claims, 6 Drawing Sheets

(58) Field of Classification Search
USPC .............................................................. 701/37
See application file for complete search history.

(56) References Cited

U.S. PATENT DOCUMENTS 4,714,271 A * 12/1987 Buma ................ B60G 17/0165 280/5.503
4,717,173 A * 1/1988 Sugasawa .............. B60G 21/05 280/5.511
4,728,120 A * 3/1988 Buma ................ B60G 21/0558 701/37
4,744,589 A * 5/1988 Buma ................ B60G 21/0556 280/5.514
4,749,210 A * 6/1988 Sugasawa .......... B60G 17/0165 280/124.102
4,770,438 A * 9/1988 Sugasawa ........ B60G 17/01941 188/266.7
4,861,067 A * 8/1989 Booher ................... B29C 70/52 280/124.101
4,936,604 A * 6/1990 Kawagoe ............. B60G 17/018 280/5.514
5,016,908 A * 5/1991 Athanas ............... B60G 17/018 188/266.5
5,024,460 A * 6/1991 Hanson ................ B60G 17/018 280/5.519
5,042,834 A * 8/1991 Yonekawa ........... B60G 17/016 280/5.513
5,043,893 A * 8/1991 Aburaya .............. B60G 17/017 280/5.514
5,071,158 A * 12/1991 Yonekawa ........... B60G 17/016 280/5.514
5,123,671 A * 6/1992 Driessen .............. B60G 17/018 188/266.8
5,163,319 A * 11/1992 Spies ...................... G01S 17/88 73/146
5,177,681 A * 1/1993 Sato ................... B60G 17/0162 701/38
5,193,844 A * 3/1993 Butsuen ................. B60G 17/08 280/124.101
5,203,584 A * 4/1993 Butsuen ............. B60G 17/0165 280/124.108
5,231,583 A * 7/1993 Lizell ................... B60G 17/015 280/5.506
5,269,557 A * 12/1993 Butsuen .................. F16F 9/468 280/5.515
5,338,058 A * 8/1994 Ohtagaki ............. B60G 17/018 701/37
5,347,457 A * 9/1994 Tanaka ............... B60G 17/0416 280/5.514
5,444,621 A * 8/1995 Matsunaga ........ B60G 17/0165 280/5.518
5,450,322 A * 9/1995 Tanaka .................... G01S 15/88 280/5.518
5,671,142 A * 9/1997 Tatarazako ............. B60G 17/06 701/37
5,794,168 A * 8/1998 Sasaki ..................... F16F 9/468 280/5.515
5,941,919 A * 8/1999 Pastor ................... B60T 8/1755 701/72
6,019,495 A * 2/2000 Yamada ............. B60G 17/0152 280/5.515
6,122,578 A * 9/2000 Knolle ................. B60G 17/016 701/40
6,233,510 B1 * 5/2001 Platner ................... B60G 13/16 382/104
6,456,194 B1 * 9/2002 Carlson ............ B60G 17/01925 340/440
8,589,063 B2 * 11/2013 Trum ............... G08G 1/096844 701/461
8,762,000 B2 * 6/2014 Schindler ............. B60G 17/018 701/41
8,892,304 B2 * 11/2014 Lu ...................... B60G 17/0165 701/37
9,550,404 B2 * 1/2017 Giovanardi ......... F15B 13/0444
10,464,388 B2 * 11/2019 Kamiya ................... B60G 3/20
10,486,485 B1 * 11/2019 Levinson ........... B60G 17/0162
10,901,432 B2 1/2021 Sridhar et al.
10,953,887 B2 * 3/2021 Magnusson ............ G08G 1/164
11,712,964 B1 * 8/2023 Drach ................ B60G 17/0157 180/245
11,724,555 B2 8/2023 Vente et al.
11,733,707 B2 8/2023 Sridhar et al.
11,766,911 B2 * 9/2023 Coerman ........... B60G 17/0165 280/5.519
11,801,726 B2 10/2023 Sridhar et al.
11,872,861 B2 * 1/2024 Konada ................ B60G 17/019
11,884,121 B2 * 1/2024 Konada .............. B60G 17/0165
11,964,682 B1 * 4/2024 Dunn .................... B61L 25/025
12,117,532 B1 * 10/2024 Blanton, Jr. .......... G01S 19/071
12,162,322 B2 * 12/2024 Hirao ..................... B60G 17/06
2005/0038584 A1 * 2/2005 Kim ....................... B60G 17/06 701/37
2005/0143918 A1 * 6/2005 Hilliard ................... G01S 19/52 701/469
2006/0074533 A1 * 4/2006 Karaba .................. B60G 17/08 701/37
2008/0033645 A1 * 2/2008 Levinson ................ G01S 19/49 701/469
2008/0275606 A1 * 11/2008 Tarasinski ............ B60G 17/016 701/37
2009/0033044 A1 * 2/2009 Linsmeier ............ B60G 17/018 280/5.514
2009/0043452 A1 * 2/2009 Sekiya .................... F16F 9/535 701/40
2009/0097038 A1 * 4/2009 Higgins-Luthman ........................ B60G 17/019 356/602
2009/0105921 A1 * 4/2009 Hanatsuka ......... B60G 17/0165 701/80
2009/0228166 A1 * 9/2009 Durkos ................ G05D 1/0219 701/26
2010/0042292 A1 * 2/2010 Schindler ........... B60G 17/0165 701/37
2010/0138108 A1 * 6/2010 Kajino ................. B60G 17/016 701/38
2010/0141759 A1 * 6/2010 Scherzinger ........... G01C 15/00 348/139
2012/0078470 A1 * 3/2012 Hirao .................... B60W 10/22 701/1
2012/0203428 A1 * 8/2012 Choi ...................... B60G 17/08 701/37
2013/0079988 A1 * 3/2013 Hirao .................. B60W 10/184 701/38
2013/0103259 A1 * 4/2013 Eng .................... B60G 17/0165 701/37
2013/0345933 A1 * 12/2013 Norton ................... B60G 17/08 701/37
2014/0195112 A1 * 7/2014 Lu ........................ B60G 17/015 703/2
2014/0195114 A1 * 7/2014 Tseng ................... B60G 17/015 701/1
2014/0288776 A1 * 9/2014 Anderson .............. B60G 17/08 701/37
2014/0303844 A1 * 10/2014 Hoffmann .......... B60G 17/0165 701/37
2014/0316652 A1 * 10/2014 Ericksen ................. F16F 9/512 701/37
2015/0088378 A1 * 3/2015 Sugai .................... B60W 10/22 701/37
2015/0224845 A1 * 8/2015 Anderson .............. B60G 13/14 701/37
2017/0096042 A1 * 4/2017 Unger ................... B60W 40/06
2017/0129298 A1 * 5/2017 Lu ........................ B60G 17/015
2017/0314926 A1 * 11/2017 Royster ................ G01C 21/005
2017/0314927 A1 * 11/2017 Royster ................ G01C 21/005
2018/0015801 A1 * 1/2018 Mohamed ............... H04L 67/12
2018/0079272 A1 * 3/2018 Aikin ................. B60G 17/0165
2018/0186210 A1 * 7/2018 Noll ..................... B60G 17/018
2018/0194286 A1 * 7/2018 Stein .................. B60G 17/0165
2018/0319237 A1 * 11/2018 Unger ................ B60G 17/0165

(56) References Cited

U.S. PATENT DOCUMENTS

2019/0079539 A1* 3/2019 Sridhar ................ B60W 40/06
2019/0137275 A1* 5/2019 Choudhury .......... G01C 21/165
2019/0359025 A1* 11/2019 Wager .................. B60G 21/005
2020/0071144 A1* 3/2020 Draayer ................ B66F 17/003
2020/0117199 A1* 4/2020 Akella ................ B60W 30/143
2020/0139784 A1* 5/2020 Sridhar .................. B60G 21/08
2020/0139967 A1* 5/2020 Beller ................. B60W 30/143
2020/0211394 A1* 7/2020 King ...................... G08G 1/166
2021/0055740 A1 2/2021 Sridhar et al.
2021/0074068 A1* 3/2021 Spivack ................. G06N 20/00
2021/0394573 A1* 12/2021 Vente ................. B60G 17/0165
2022/0082705 A1* 3/2022 Graves ................ B60W 60/001
2022/0134835 A1* 5/2022 Izak ................... B60G 21/0553 701/38
2022/0189302 A1* 6/2022 Jiang ...................... G01C 21/14
2022/0196849 A1* 6/2022 Chen ....................... G01S 19/51
2022/0212678 A1* 7/2022 Eisenmann ......... B60W 40/105
2022/0268878 A1* 8/2022 Gulati ................... G01S 13/931
2022/0281456 A1* 9/2022 Giovanardi ........... B60W 10/22
2022/0324421 A1* 10/2022 Giovanardi .......... G08G 1/0145
2022/0379679 A1* 12/2022 Eisenmann ........ B60G 17/0165
2022/0390239 A1* 12/2022 Eisenmann ............ G01C 21/30
2023/0017774 A1* 1/2023 Giovanardi ........... B60W 40/06
2023/0174178 A1* 6/2023 Andringa .............. B28C 5/4248
2023/0208850 A1* 6/2023 Yin ..................... G06F 21/6218 726/6
2023/0254672 A1* 8/2023 Yin ........................ G01C 21/30 701/408
2023/0271594 A1* 8/2023 Chen .................. B60G 17/0165 701/70
2023/0294473 A1* 9/2023 Ali ..................... B60G 17/0165 701/37
2024/0001924 A1* 1/2024 Giovanardi ........... B60W 30/04
2024/0208290 A1* 6/2024 Kim ................... B60G 17/0165
2024/0253413 A1* 8/2024 Hawkins ............ B60G 17/0165
2024/0300275 A1* 9/2024 Anderson ............ B60G 11/265
2024/0317008 A1* 9/2024 Giovanardi .......... B60G 17/016

FOREIGN PATENT DOCUMENTS

WO WO 2012/019691 A1 2/2012
WO WO 2019/049080 A2 3/2019
WO WO 2021/138431 A1 7/2021

OTHER PUBLICATIONS

International Preliminary Report on Patentability for International Application No. PCT/US2023/012921 mailed Aug. 29, 2024.

* cited by examiner

DYNAMICALLY TUNABLE COMBINATION REACTIVE-PROACTIVE CONTROLLER

RELATED APPLICATIONS

This application is a national stage filing under 35 U.S.C. § 371 of International Patent Application Serial No. PCT/US2023/012921, filed Feb. 13, 2023, which claims the benefit of priority of U.S. Provisional Application Ser. No. 63/309,723, filed Feb. 14, 2022, the entire contents of each of which are incorporated herein by reference in their entirety.

TECHNICAL FIELD

Disclosed embodiments are related to methods and apparatus for the simultaneous proactive and reactive control of on-board vehicular systems. Furthermore, these methods and apparatus may be used to dynamically transition or adjust the balance between these two modes.

BACKGROUND

Systems on-board some vehicles are operated proactively, e.g., based on preview or a priori information (e.g., information stored in a remote data base, or a database on-board the vehicle) that characterizes at least some aspects of a road segment ahead of a vehicle.

Alternatively, systems on-board some vehicles are operated reactively, e.g., in reaction to data from one or more sensors on-board the vehicle. Systems that may be operated proactively or reactively may include: active or semi-active suspension systems, braking systems, steering systems etc. Localization of the vehicle may be based on, for example, data from a Global Navigation Satellite Systems (GNSS), and/or terrain-based navigation systems, when previously stored road information may be used to locate and/or to control one or more vehicle systems.

SUMMARY

According to one aspect, there is provided a method of controlling a system, in a vehicle, with a combination reactive-proactive controller, when the vehicle is traveling along a road surface. The method may include a first mode of operation that may include: receiving a priori information from a database, about an aspect of a first portion of the road surface, at a microprocessor before arriving at the first portion of the road; operating the combination reactive-proactive controller in a reactive-proactive mode to formulate a first command based on the a priori information; operating the system based on the first command, when the vehicle is at the first portion of the road. The method may also include a second mode of operation that may include: receiving information about an aspect of the second portion of the road surface from at least one on-board sensor, at a microprocessor, when the vehicle is at the second portion of the road; operating the combination reactive-proactive controller in a reactive-only mode to formulate a second command based on the information from the at least one sensor; when the vehicle is at the second portion of the road, operating the system based on the second command. In some embodiments, the system may be a suspension system (e.g., semi-active or fully active suspension system) actuator. In some embodiments, the database is a remote database (e.g., not located on the vehicle, located in the cloud). In some embodiments, the vehicle may operate in the second mode of operation when communication with the database is interrupted for a predetermined period of time or longer. In some embodiments, the vehicle may operate in the second mode of operation when a location of the vehicle cannot be determined with a sufficient degree of precision or confidence. In some embodiments, the sufficient degree of precision is achieved when the absolute or relative position of the vehicle is known or can be determined to within 10 centimeters, to within 5 centimeters, or to within 1 centimeter. Further, in some embodiments, precision greater than or less than the ranges indicated above may be considered sufficient, as the disclosure is not so limited. In some embodiments, a sufficient degree of precision and/or confidence may be achieved when the localization is based on a number of satellites greater than a threshold, or when the terrain-based localization reports a precision and/or confidence level above a threshold. In some embodiments, under at least one operating condition the vehicle may transition from operating in the first mode to operating in the second mode. In some embodiments, under at least one operating condition the vehicle may transition from operating in the second mode to operating in the first mode. In some embodiments, the combination reactive-proactive controller operates according to an algorithm running on at least one microprocessor, wherein the algorithm includes at least one parameter, and wherein a value of the at least one parameter may be changed during a transition between the first mode and the second mode. In some embodiments, the at least one parameter may be a gain. In some embodiments, the at least one parameter may be changed from a first value to a second value. In some embodiments, the first value of the at least one parameter may be one and the second value of the at least one parameter may be zero. In some embodiments, the first value of the at least one parameter may be zero and the second value of the at least one parameter may be one. In some embodiments, the change may occur gradually over a period of at least 0.5 seconds but less than 1.5 seconds. In some embodiments, the change may be, for example, a linear function of time, a quadratic function of time or an exponential function of time. Further, in some embodiments, the transition may occur over periods that are longer or equal to 1.5 seconds or periods that are shorter than 0.5 seconds, as the disclosure is not so limited.

According to one aspect, there is provided a method controlling a system, in a vehicle, with a first combination reactive-proactive controller and a second combination reactive-proactive controller, when the vehicle is traveling along a road surface. The method may include a first mode of operation that may include: receiving a priori information from a database, about an aspect of a first portion of the road surface, at a microprocessor before arriving at the first portion of the road; operating the first combination reactive-proactive controller in a reactive-proactive mode to formulate a first command, based on the a priori information, to control the system in a first frequency range; operating the second combination reactive-proactive controller in a reactive-proactive mode to formulate a second command, based on the a priori information, to control the system in a second frequency range; when the vehicle is at the first portion of the road, operating the system based on the first command and the second command. The method may also include a second mode of operation that may include: receiving information about an aspect of the second portion of the road surface from at least one on-board sensor, at a microprocessor, when the vehicle is at the second portion of the road; operating the first combination reactive-proactive controller in a reactive-only mode to formulate a third command based on the information from the at least one sensor; operating the second combination reactive-proactive controller in a reactive-only mode to formulate a fourth command based on the information from the at least one sensor; and when the vehicle is at the second portion of the road, operating the system based on the third and fourth command. In some embodiments, the system may be a suspension system (e.g., semi-active or fully active) actuator. In some embodiments, the database may be a remote database, e.g., a database in the cloud. In some embodiments, the vehicle may operate in the second mode of operation when communication with the database is interrupted for a predetermined period of time. In some embodiments, the vehicle may operate in the second mode of operation when a location of the vehicle cannot be determined with a sufficient degree of precision or confidence. In some embodiments, the sufficient degree of precision may be when the position of the vehicle is known or can be determined to with 10 centimeters, 5 centimeters, or 1 centimeter. Further, in some embodiments, precision greater than or less than the ranges indicated above may be considered sufficient, as the disclosure is not so limited. In some embodiments, under at least one operating condition the vehicle transitions from operating in the first mode to operating in the second mode and/or from operating in the second mode to operating in the first mode. In some embodiments, the combination reactive-proactive controller operates according to at least one algorithm running on at least one microprocessor, wherein the at least one algorithm includes at least one parameter, and where a value of the at least one parameter, e.g., a gain, is changed during a transition between the first mode and the second mode. In some embodiments, the value of the at least one parameter may be changed from a first value to a second value. In some embodiments, the first value of the at least one parameter may be one and the second value of the parameter may be zero. In some embodiments, the first value of the at least one parameter may be zero and the second value of the at least one parameter may be one. In some embodiments, the change may occur gradually over a period of at least 0.5 seconds but less than 1.5 seconds. Further, in some embodiments, the transition may occur over periods that are longer or equal to 1.5 seconds or periods that are shorter than 0.5 seconds, as the disclosure is not so limited. In some embodiments, the change may be a linear function of time, a quadratic function of time, or an exponential function of time. In some embodiments, the first frequency range and third frequency range may be equal and/or the second frequency range and fourth frequency range may be equal. In some embodiments, the first frequency range and third frequency ranges may include certain frequencies above 0.1 Hz but below 2 Hz and the second frequency range and fourth frequency range include certain frequencies equal to or above 2 Hz but below 20 Hz. Further, the first and third frequency range may include some frequencies greater than equal to 0.1 Hz and less than or equal to 1.5 Hz and second and fourth frequency range may include some frequencies equal to or above 1.5 Hz but below 20 Hz. Combinations of different portions of the above ranges are contemplated, as the disclosure is not so limited.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF FIGURES

The accompanying drawings are not intended to be drawn to scale. In the drawings, each identical or nearly identical component that is illustrated in the various figures may or may not be represented by a like numeral. For purposes of clarity, not every component may be labeled in every drawing. In the drawings.

DETAILED DESCRIPTION

Figure 1:
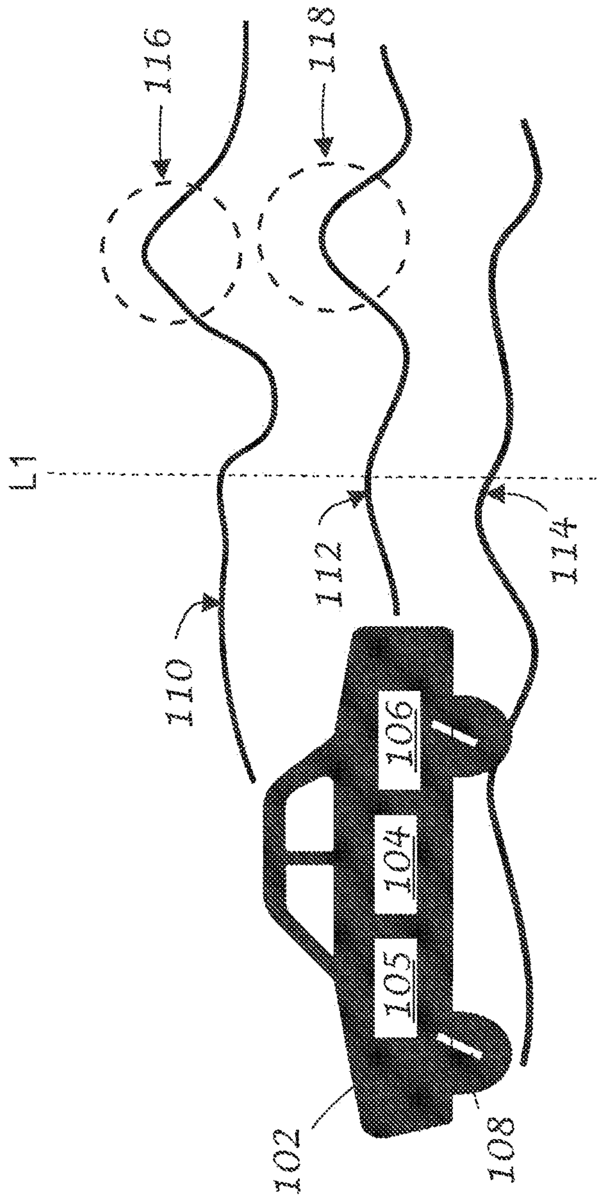
FIG. 1 illustrates a vehicle with suspension actuators traveling along a road surface.

In some embodiments, controllers in a vehicle may be operated reactively based on real time sensor data or, alternatively, may be operated proactively based on previously collected data, a priori, or preview data. However, inventors have recognized that in some embodiments, controllers operating one or more systems, (e.g., vehicle systems, active or semi-active suspension systems, braking systems, steering systems), may, in at least one or more modes, be simultaneously or alternately operated reactively and proactively. Inventors have further recognized that, in such combination operating modes, reactive controller commands, e.g., based on real time sensor data (e.g., accelerometer, IMU, displacement data), may at least partially conflict or be inconsistent with proactive commands that may be based on a priori or preview information. In some embodiments, access to previously collected information, e.g., information received from remote database, or the flow of real time data, e.g., from on-board sensors, may be occasionally interrupted or otherwise be unavailable. Alternatively or additionally, a vehicle may not be able to determine its location with sufficient precision. Under one or more of such scenarios, a reactive-proactive controller may switch between a combination reactive-proactive mode and a reactive-only mode. In some embodiments when access to a priori data and/or loss of localization precision is temporary and is restored, the reactive-proactive controller may switch back to a combination mode.

As used herein, the term "previously collected road data," "a priori road data,", or "preview road data" refers to information about aspects of a road or road segment (e.g. road surface information (e.g., road surface characteristics, characteristics of potholes and other surface anomalies), road surface profile) ahead of a vehicle. As used herein, the term "road surface profile" refers to the vertical height of the surface (e.g., relative to a nominal surface or arbitrary plane). Alternatively it may refer to the first or second derivatives of the vertical height, for example along a two-dimensional cross-section of the road or road segment. As used herein, the term "longitudinal road surface profile" refers to road surface profile in the direction of travel along the road.

In some embodiments, a reactive controller may react based on one or more setpoint or reference inputs and one or more feedback signals from sensors that monitor the state of the system being controlled, e.g., the state of the body of a vehicle. Alternatively, in some embodiments, a proactive controller may be used that provides one or more predetermined inputs to a controller, based on previously recorded or stored data that may cause a system to act according to a predetermined plan or set of rules. It is noted that setpoint or reference inputs may be constant or variable as a function of time.

As discussed above, in some embodiments, a system may be operated by a controller that simultaneously acts as both a reactive and a proactive controller. Such a combination controller may receive feedback information from sensors that monitor the state of the system being controlled as well as setpoint or reference information from a data source (e.g., a database and/or a model).

As discussed above, in some embodiments of a combination controller, a priori information and/or localization data that may be needed to properly use that information, may not be available continuously. Accordingly, a reactive-proactive controller may occasionally engage and disengage the proactive control component. Inventors have recognized that on occasions where there are such interruptions, the operation of a controller and/or the system being controlled may be adversely affected by the switching between the different modes.

Using a priori information about the upcoming road or road segment, as well as precise localization (i.e., localization that may determine a location with absolute or relative accuracy to less than 1 meter, e.g. on the order of 1-100 centimeters, etc.), the system described herein may be used to command active and/or passive actuators (e.g., an active suspension system, or a semi-active suspension system) in order to provide improved ride and/or handling and/or safety characteristics compared to a feedback-only control loop. However, such commands may result in poor or undesirable ride characteristics under various operating conditions, such as for example, if: (1) information about the road surface or the vehicle's location is inaccurate and/or (2) the model used to determine the desired command is incorrect. In other words, the commands based on a priori information may not be fully appropriate for at least a portion of the road or road segment ahead of the vehicle.

Systems and methods described herein may detect such situations and may inform a controller to change one or more output commands. Systems and methods described herein may continuously or intermittently analyze a recent record, for example the previous few seconds, of vehicle motion, road motion, and/or actuator commands to determine whether one or more of the commands by the controller during this period have been beneficial or detrimental to the performance of the vehicle based on one or more criteria based on, e.g., sensor measurements or occupant feedback. If the system determines that the system performance is lacking, output commands and/or models used to determine them may be adjusted to avoid continued poor performance.

In some implementations, controller proactive commands may be scaled down in order to improve performance. For example, the system may apply a 10% gain, a 50% gain, a gain that is less than 100% etc. to one or more of the controller's commands to adjust the output of the system. In some instances, scaling down the output commands may be frequency dependent. For example, gains may be applied only to output commands in particular frequency ranges or may be applied differently across different frequency ranges. For example, in a first frequency range a 10% gain may be applied, in a second frequency range a 50% gain may be applied, and in a third frequency range no gain scaling may be applied. This distribution allows the system to maintain performance in frequency ranges that may not be experiencing degraded performance issues. A feedback control system, such as for example, a suspension system (e.g., an active suspension, a semi-active suspension, an active roll system), and/or active steering system may use signals from one or more sensors to calculate a system state and a desired response. The control system may then produce a command for one or more actuators to follow. This process may rely on fast response and processing, but may tolerate any type of input variation.

A proactive control system may use, for example, a crowd-sourced method for estimating road profile and road event data, along with a method for localization to provide information about an upcoming road profile or events to another system on-board a vehicle. Such a controller may predict one or more aspects of upcoming disturbances and thus may tolerate much slower system response and processing times than may be used in a feedback system. However, it may be sensitive to input variation or errors, for example, due to reliance on inaccurate road profile and/or road event data. Such inaccuracies may occur, for example, due to an unaccounted-for deviation of the vehicle from an expected path, incorrect localization, or due to a change in the road profile since the data was collected.

In some embodiments, a combination of the two methods may be used to take advantage of the strengths of each type of control strategy. When optimizing the control strategy for both methods simultaneously, the proactive controller component of the controller may focus on the desired response to a predicted input, while the reactive controller component of the controller may be used to correct the output and to monitor the efficacy of the proactive control.

In one embodiment of a vehicle controller, the proactive and reactive components may be set to achieve the same goal, for example, a reduction in vertical acceleration of a portion of the vehicle, e.g., the vehicle sprung mass, or the vehicle body, over a given frequency range. If the proactive control is functioning correctly, and the disturbance input is predicted accurately, then the reactive control may not need to compensate for any errors.

As a result, the command signal correction provided by the reactive controller may be small or effectively zero in the targeted frequency range. In some embodiments where a combined proactive/reactive controller is used, there may be a preset threshold value (e.g. less than or equal to 1/10 of the reactive controller's maximum output) for the command signal correction. In such an embodiment, if the reactive control output grows beyond this threshold, it may be used as an indicator of a malfunctioning of the proactive control, for example, due to a deviation of the vehicle from its anticipated path.

When optimizing a reactive controller for a given plant or system (for example, a vehicle with one or more actuators in the vehicle), the goal may be to cancel the effects of disturbance inputs from the environment. For example, a controller may be designed to minimize vehicle vertical body acceleration in a given frequency range due to road-induced disturbances. In some embodiments, the limit to performance may be the response time of the system (the actuator, the sensors, and/or the processor). A proactive controller may achieve better performance due to, e.g., its ability to tolerate latency and slower response of a system. Therefore, when the proactive controller is effective, the reactive controller may only correct predictive errors of the proactive control component. This may be achieved with a different control logic, and in one implementation, the reactive controller component may change to a different tuning, only to switch back to a reactive tuning when the proactive controller fails to predict and/or react to disturbances with sufficient accuracy or is otherwise disabled.

In some embodiments, such a combination controller arrangement may be used to compensate for the diminished performance of a reactive controller, for example, performance at higher frequencies, such as, e.g., above 8 Hz, by modifying the tuning of the reactive controller, for example by reducing its overall gain, without a loss in overall performance due to the performance of the proactive control component.

By using optimization control techniques each controller may be optimally tuned independently or as a combination, in order to achieve a desired overall performance. For example, the feedback controller may be tuned to contribute only in a certain range of frequencies, whereas the proactive controller may be tuned to contribute in a complementary frequency range.

In some embodiments, a proactive controller may provide a sensor reference and a proactive command, and the reactive controller may provide a reactive command in response to sensor signal. When the proactive control is disabled, the feedback loop on the reactive controller may remain on but the tuning parameters for the controller may be altered.

Referring to FIG. 1, a vehicle 102 may be instrumented with one or more sensors. The one or more sensors may include one or more sensors 104 that may be used to measure one or more quantities associated with ride characteristics (e.g., body accelerometers, ride height sensors, wheel accelerometers) and one or more sensors 106 for collecting data that may be used for terrain-based localization (e.g., body accelerometers, wheel accelerometers, ride height sensors, laser sensors, radar sensors, ground-penetrating radar sensors, and/or others). The vehicle 102 may include fully active or semi-active suspension dampers (e.g., actuator 108) which may receive active or passive force commands from a controller 105 on-board vehicle 102.

Using information about the upcoming road, a command may be formulated and conveyed to the actuators (including actuator 108) to improve the ride performance of the vehicle 102. As the vehicle 102 travels across a road surface 114, the vehicle's wheels may move (e.g., in the vertical direction or partially in the vertical direction) as a result of interacting with one or more features of the road surface (e.g., road roughness, road profile, road events, etc.). A force command 112 may be conveyed to one or more suspension actuators (e.g., actuator 108). If this force command 112 is calculated based on a correct model and accurate information about road surface 114, the ride of the vehicle 102 may be improved. In some implementations, e.g., a road isolation strategy, e.g., sky hook, may be implemented so as to reduce the vertical body motion 110 of the vehicle. In some implementations, e.g., where a road following strategy, e.g., ground hook, may be implemented, vertical body motion 110 may more closely follow vertical displacements of the road surface 114. In FIG. 1, to the left of line L1, the body motion, as illustrated by body motion trace 110, has been mitigated relative to the vertical displacement of the road surface 114. This behavior may be achieved based on an accurate model of the vehicle, accurate information about the road surface 114 and information about the location of the vehicle to a sufficient degree of precision. An appropriate force command 112 may be formulated in order to isolate the body motion of the vehicle 102 from disturbances induced by the road surface 114. However, if either, or both, of the model or road surface information is not sufficiently accurate and/or the location of vehicle 102 is not known with sufficient precision, such as in FIG. 1 to the right of L1, there may be less ride isolation (e.g., worse performance than if no control force were applied, or worse performance than a comparable passive vehicle, or worse performance than if a purely reactive control strategy were used) rather than improved (e.g., better performance than a comparable passive vehicle or better performance than if a purely reactive control strategy were used) as illustrated in FIG. 1 on the right side of line L1. For example, errors or inaccuracies in the model or errors or inaccuracies in the information about the characteristics of road surface 114 may result in an inappropriate force command, which may result in, for example, an errant peak 118 in the force command. The errant force command may increase body motion (e.g., as compared to expected body motion of a comparable passive vehicle or reactive-only control strategy), shown as peak 116 in the vehicle body motion.

Figure 2:
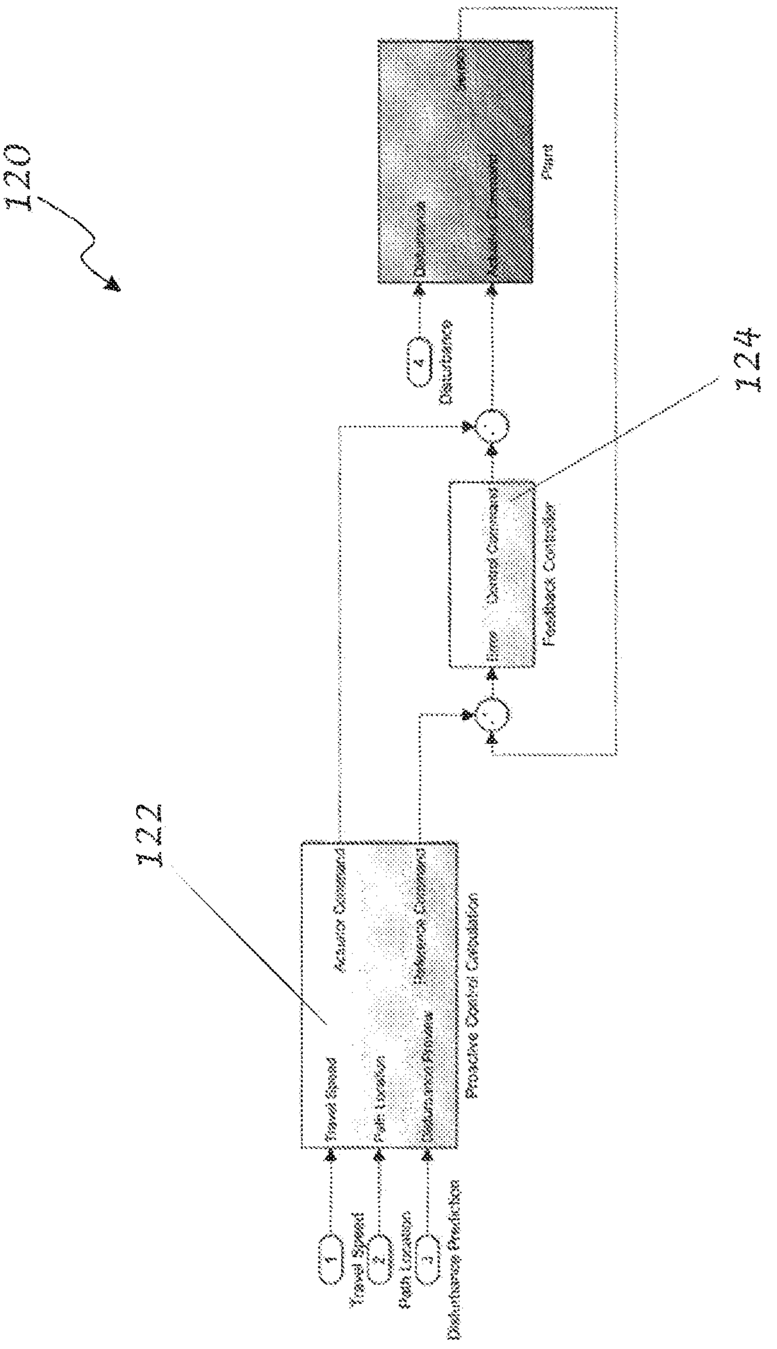
FIG. 2 illustrates a block diagram of a system for generating a force command based on preview and/or feedback information, and that dampens vehicle body motion induced as a result of interacting with a road surface.

The block diagram in FIG. 2 illustrates an exemplary embodiment of a controller 120 with a proactive controller component 122 in combination with a feedback loop that includes a reactive (i.e., feedback) component 124. According to various embodiments, other controller configurations, such as those without feedback loops, with feedforward loops, as well as those for semi-active and partially active systems may be used as the disclosure is not so limited.

In the embodiment of FIG. 2, proactive controller component 122 may provide two outputs. First, it may provide an actuator command that may be configured such that it creates a desired response of the plant or controlled system to a disturbance. As a second output, the expected sensor signal, may be determined based at least partially on road data, e.g., previously recorded crowd-sourced road data, that may be received from a database (e.g., remote database in the cloud, on-board database). The second output may be provided to the reactive controller component 124 as a reference signal. Accordingly, in this embodiment, the proactive control strategy may be insensitive to the feedback loop. If the actuator command from the proactive control results in the expected reference output from the sensors, then the feedback loop may indicate effectively no error and thus produce effectively no reaction. If, on the other hand, there is an error, due, for example, to inaccuracies in the expected disturbance (for example due to an error in localization of the vehicle), then the feedback loop may work to correct the resulting error in the motion.

Figure 3:
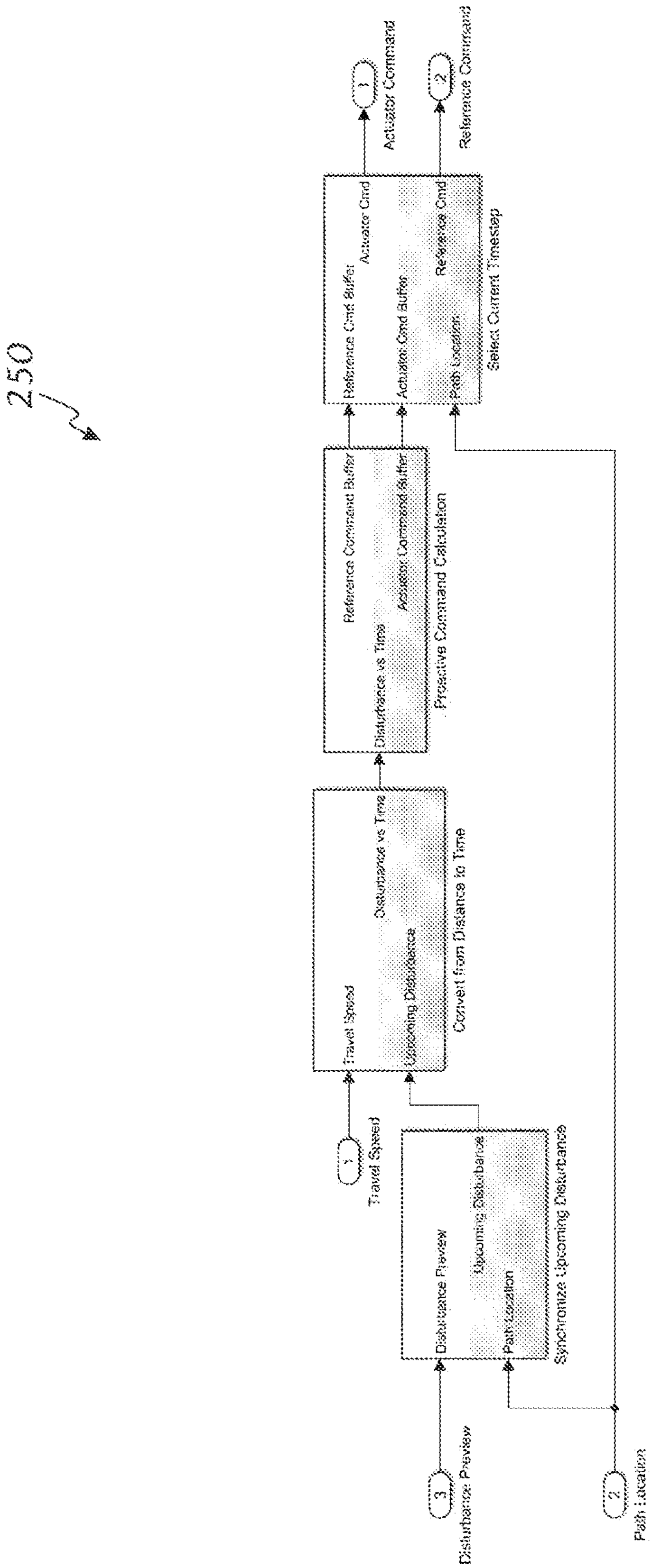
FIG. 3 shows another embodiment of a layout of a proactive controller.

In some embodiments of the combination reactive-proactive controller of FIG. 2, a vehicle may be travelling over a known surface, for example, a road where surface information was previously recorded. Accordingly, if the disturbance preview and the location of the vehicle with sufficient precision are available, then a time signal of the upcoming disturbance may be determined by a proactive controller if, for example, the vehicle travel speed is also known. For example, if a general road profile defined as $z_{road}=f(s_{road},y)$ is available, where the vertical height of the road $z_{road}$ is a function of the longitudinal coordinate along the path $s_{road}$ and the lateral location y. Knowing the location $s_{current}$ along the path of the vehicle at any given time, and knowing the travel speed $v_s=\partial s/\partial t$, the upcoming vertical road velocity may be expressed as a function of time as $\partial z/\partial t=\partial z/\partial s\ v_s$. If this input is determined for each location along a section of the path, a time trace of command input for the control system may be calculated. Knowing the current path location, the appropriate command may be provided to the system at the appropriate time to achieve the desired result. FIG. 3 shows aspects of an embodiment employing a proactive controller 250.

Figure 4:
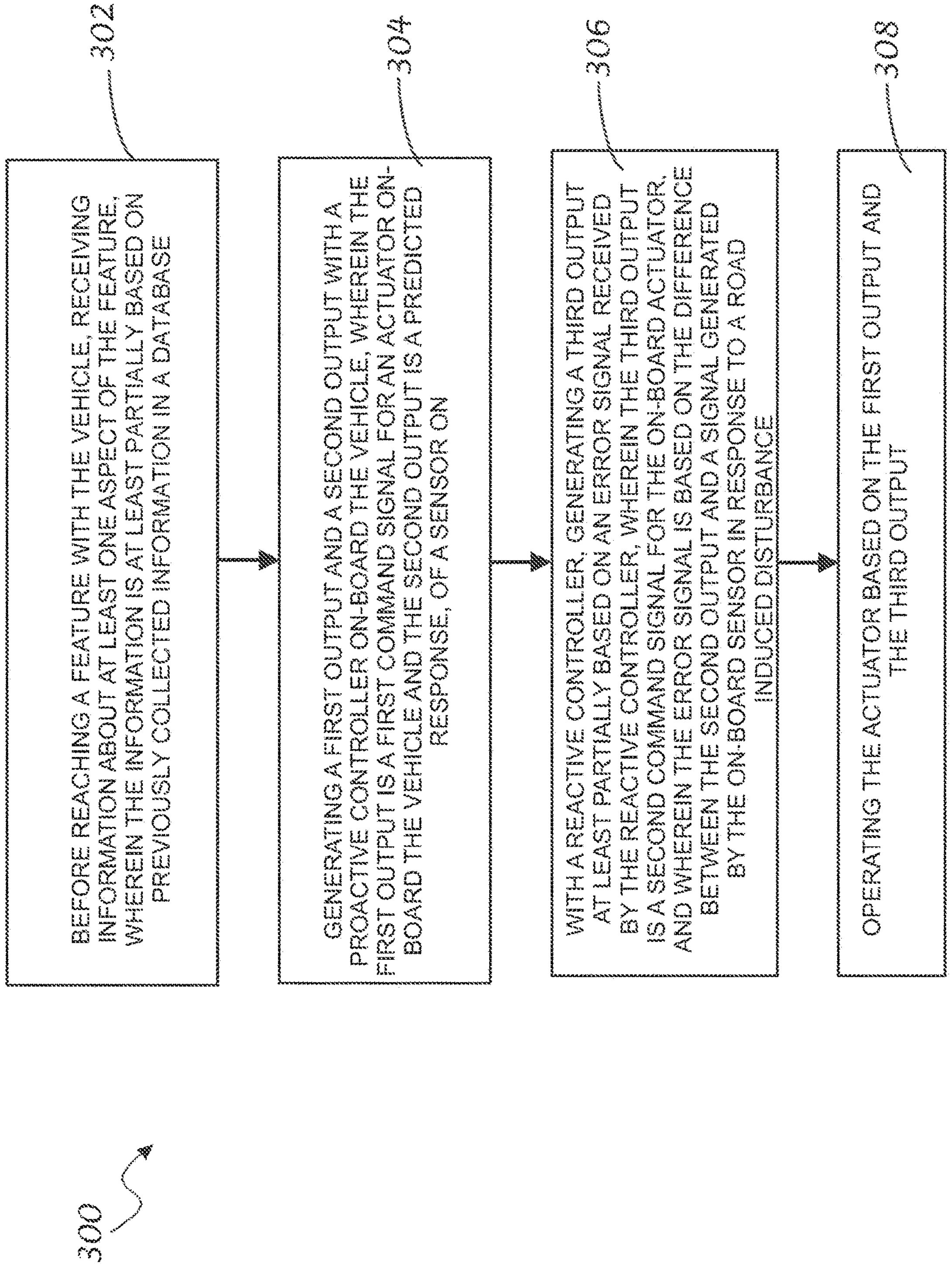
FIG. 4 shows one embodiment of the content of a proactive control calculation block.

Referring to FIG. 4, a flow chart 300 depicts a method of controlling a response of a vehicle to a road induced disturbance caused by an interaction with a surface feature of the road. The method includes receiving (302) information about at least one aspect of the feature before the vehicle reaches the feature, wherein the information is at least partially based on previously collected, e.g., crowd-sourced or otherwise previously measured, data. The method also includes, at least partially based on the information in step 302, generating (304) a first output and a second output with a proactive controller component on-board the vehicle, wherein the first output is a first command signal for an actuator on-board the vehicle and the second output is a predicted response, of a sensor on-board the vehicle, to the disturbance. The method also includes generating (306), with a reactive controller component, a third output at least partially based on an error signal received by the reactive controller component, wherein the third output is a second command signal for the on-board actuator, and wherein the error signal is based on the difference between the second output in step 304 and a signal generated by the on-board sensor in response to the disturbance. The method also includes operating (308) the actuator based on the first output and the third output. In some implementations, the actuator is an active suspension actuator.

Figure 5:
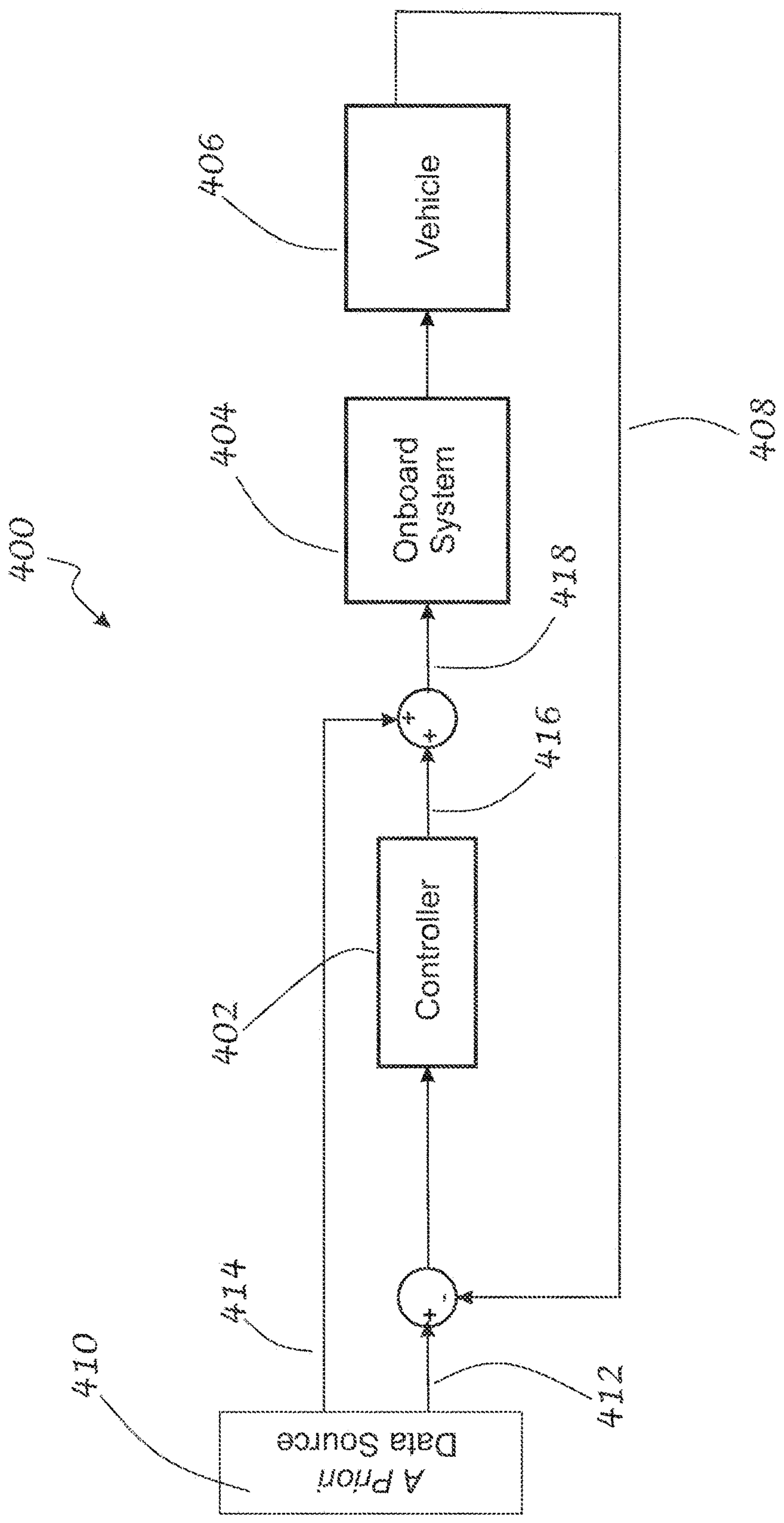
FIG. 5 illustrates an embodiment of a control system of a vehicle that includes a reactive-proactive controller.

FIG. 5 illustrates an exemplary controller system 400 that includes a combination reactive-proactive controller 402 that operates a system 404, (e.g., a suspension system (e.g., fully or semi active suspension system), steering system, a braking system), on-board the vehicle 406. The controller 402 controls an aspect of the motion of vehicle 406. The controller 402 may operate in a combination reactive-proactive mode, a proactive-only mode, a reactive-only mode, and/or a transition mode.

In some embodiments, when in a combination reactive-proactive mode, controller 402 may receive a signal that is the equal to the difference between a real-time signal 408, that is a measurement of an aspect of the motion of the vehicle 406, and a set-point or reference signal 412, which may be constant or variable as a function of time, provided by data source 410. The value of the set-point or reference signal may be based on a priori information about the road ahead of vehicle 406. The set-point or reference signal may be, e.g., a desired value of the magnitude of the aspect of the motion represented by signal 408. Data source 410 may also provide a command signal 414 which may be added to the command signal 416 provided by controller 402. The on-board system 404 may be operated based on command signal 418, i.e., the sum of the command signal 414 and command signal 416. If the set-point signal 412 and command signal 414 are accurately determined, signal 408 may be zero or effectively zero.

In some embodiments, if there is an inaccuracy in either or both of these values, signal 408 may be used to correct the resulting aspect of the vehicle motion. However, if the on-board system 404 is an active suspension actuator and the set point or reference is zero, (e.g., if it is desired that a portion of the vehicle body does not move in the vertical direction in response to road induced disturbances, e.g. if it is desired that a portion of the vehicle body is isolated from road induced disturbances), and if the command signal 414 is determined accurately to achieve the desired motion, signal 408 may be equal to zero.

In some embodiments of system 400, if data source is unable to access a priori road data, e.g., because of interrupted communication with a remote data base, the data source may provide a set-point signal of a predetermined value, e.g., zero, and a command signal 414 of a predetermined value, e.g., zero. In such a scenario, controller 402 may operate in a reactive-only mode. In some embodiments, for example when access to a priori road data is restored, data source 410 may revert to a reactive-proactive mode of operation.

When switching from one mode to another mode, an abrupt change in the value of signals 412 and 414 from, e.g., a current value to a different value, e.g., a predetermined value, may produce a undesirable disruption in system performance. In some embodiments, when switching between modes, the data source 410 may apply a gain that gradually transitions from a current value to a target value. For example, when transitioning from a reactive-proactive mode to a reactive-only mode by adjusting the gain of one or more output signals, e.g., signal 412 and/or signal 414, from a current value to a target value, e.g. zero. This gradual transition may occur, e.g., over a period of 0.5 seconds to a period of 1.5 seconds. Periods both greater than and less than this range are also contemplated as the disclosure is not so limited.

Figure 6:
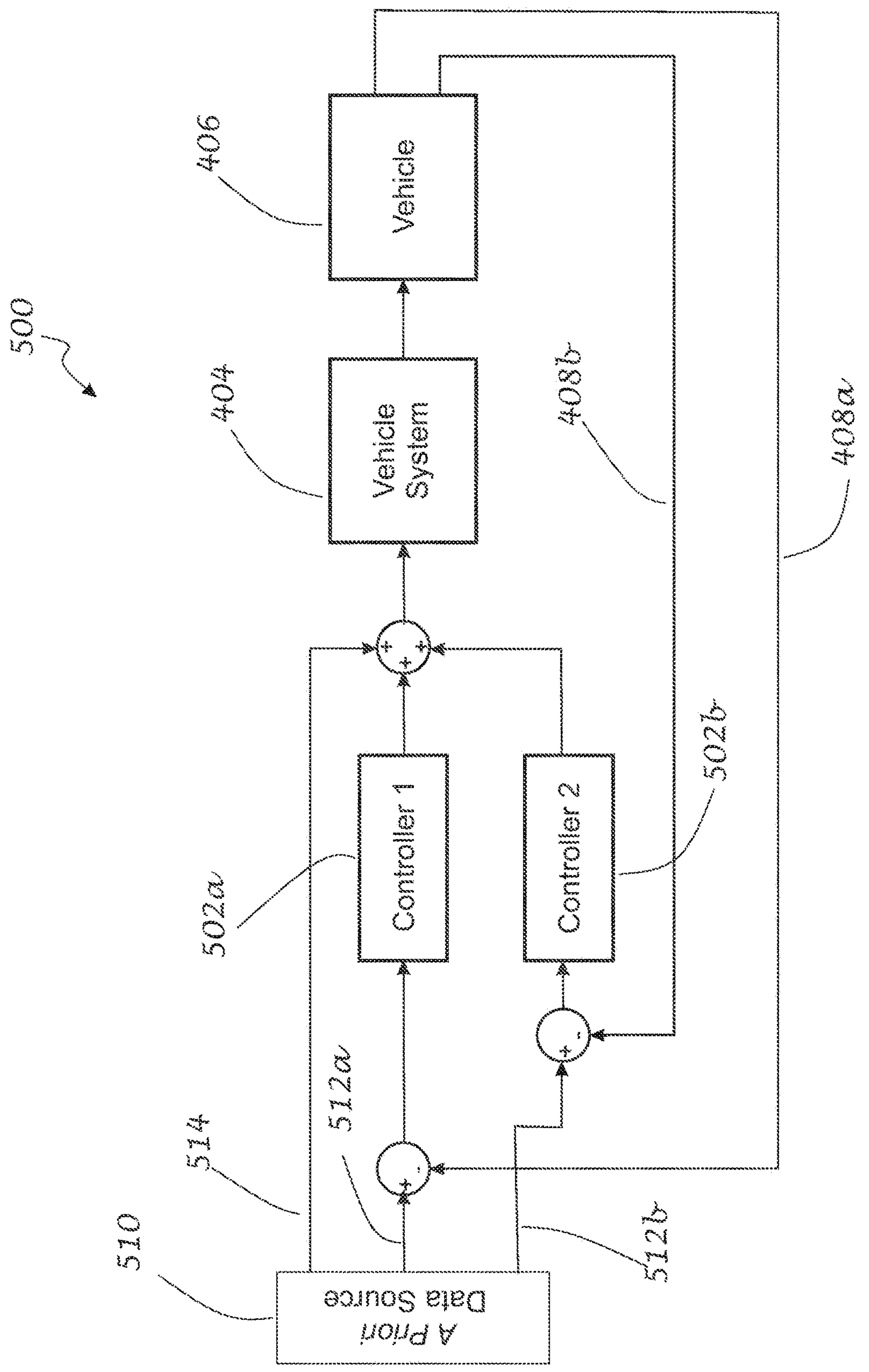
FIG. 6 illustrates a control system of a vehicle that includes two reactive-proactive controllers.

FIG. 6 illustrates an exemplary controller system 500, that includes two combination reactive-proactive controllers 502*a* and 502*b* and that operates system 404 of the embodiment illustrated in FIG. 5. In some embodiments, controller 502*a* may provide commands in a first range of frequencies while controller 502*b* may provide commands in a second range of frequencies.

In some embodiments, the first range may be above a threshold frequency while the second range is below that threshold frequency. In some embodiments, data source 510 may provide the same or different set-point or reference signals to the two controllers. For example, in some embodiments the set-point provided to controller 502*a* for the higher frequency range may be zero, e.g., to achieve isolation from road disturbances, while set-point provided to controller 502*b* for the lower frequency range may be equal to a non-zero number, e.g. to achieve tracking of road vertical displacement. In some embodiments, the non-zero set-point or reference provided to controller 502*b* may be equal to the vertical displacement, based on a priori information, of the road surface relative to a predetermined baseline.

In some embodiments, if the data source 510 loses access to a priori data or vehicle position, set-point or reference signal 512*a*, set-point or signal 512*b*, and/or command signal 514 may be set to zero, effectively zero, or another predetermined value. In such a scenario, one or both controllers 502*a* and 502*b* may operate in a reactive-only mode. In some embodiments, when access to a priori data is reestablished, one or both controllers may revert to a reactive-proactive mode of operation.

In some embodiments, when switching between modes, the data source 510 may adjust output gains gradually from a current value to a target value to achieve a smooth transition between modes as discussed above in connection with the embodiment disclosed in FIG. 5.

In some embodiments, at least one error signal calculated as the difference between sensor signal 408 and reference signal 412, which is used as the input into controller 402, may be used to ascertain the quality of the proactive control component. For example, the signal may be compared to a threshold, or filtered within a frequency band and then compared to a threshold, or filtered above or below a frequency and then compared to a threshold. If the signal exceeds at least one threshold, a determination may be made about the quality of the proactive control, and appropriate action may be taken. For example, if the signal exceeds a first threshold, or exceeds it during a determined period of time, or has a signal energy as determined by methods such as root mean square (rms) or other similar methods that exceeds a threshold, the proactive control gain may be lowered, and if the signal exceeds a second threshold, the proactive control may be deactivated.

The above-described embodiments of the technology described herein may be implemented in any of numerous ways. For example, the embodiments may be implemented using hardware, software or a combination thereof. When implemented in software, the software code may be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format. It should also be understood that any reference to a controller in the current disclosure may be understood to reference the use of one or more processors configured to implement the one or more methods disclosed herein.

Further, it should be appreciated that a computing device including one or more processors may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices may be used, among other things, to present a user interface. Examples of output devices that may be used to provide a user interface include display screens for visual presentation of output and speakers or other sound generating devices for audible presentation of output. Examples of input devices that may be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. These methods may be embodied as processor executable instructions stored on associated non-transitory computer readable media that when executed by the one or more processors perform any of the methods disclosed herein. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media may be transportable, such that the program or programs stored thereon may be loaded onto one or more different computing devices or other processors to implement various aspects of the present disclosure as discussed above. As used herein, the term “computer-readable storage medium” encompasses only a non-transitory computer-readable medium that may be considered to be a manufacture (i.e., article of manufacture) or a machine. Alternatively or additionally, the disclosure may be embodied as a computer readable medium other than a computer-readable storage medium, such as a propagating signal.

The terms “program” or “software” are used herein in a generic sense to refer to any type of computer code or set of computer-executable instructions that may be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a “user.” It should be appreciated that a “user” need not be a single individual, and that in some embodiments, actions attributable to a “user” may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method of controlling a system, in a vehicle, with a combination reactive-proactive controller, the method comprising:

traveling on a road surface, the road surface ahead of the vehicle including a first portion of the road surface and a second portion of the road surface;

before traveling on the first portion of the road surface, receiving, at one or more microprocessors on-board the vehicle, information from a database about the first portion of the road surface;

traveling on the first portion of the road surface;

during travel on the first portion of the road surface, receiving, at the one or more microprocessors, information about the first portion of the road surface from at least one on-board sensor;

while traveling on the first portion of the road surface, operating the combination reactive-proactive controller in a reactive-proactive mode as a first mode of operation to formulate a first command based on both the information received from the database and the information received from the at least one on-board sensor;

while traveling on the first portion of the road surface, controlling the system based on the first command;

traveling on the second portion of the road surface;

during travel on the second portion of the road surface, receiving, at the one or more microprocessors, information about the second portion of the road surface from the at least one on-board sensor;

operating the combination reactive-proactive controller in a reactive-only mode as a second mode of operation to formulate a second command based on the information from the at least one on-board sensor; and while traveling on the second portion of the road surface, controlling the system based on the second command.

2. The method of claim 1, wherein, under at least one operating condition the vehicle transitions from operating in the first mode to operating in the second mode.

3. The method of claim 2, wherein the combination reactive-proactive controller operates according to an algorithm running on at least one microprocessor, wherein the algorithm includes at least one parameter, and wherein a value of the at least one parameter is changed during a transition between the first mode and the second mode.

4. The method of claim 3, wherein the at least one parameter is a gain, wherein the value of the at least one parameter is changed from a first value to a second value.

5. The method of claim 4, the first value of the at least one parameter is one and the second value of the at least one parameter is zero.

6. The method of claim 4, wherein first value of the at least one parameter is zero and the second value of the at least one parameter is one.

7. The method of claim 4, wherein the change occurs gradually over a period of at least 0.5 seconds but less than 1.5 seconds.

8. The method of claim 7, the change is a linear function of time.

9. The method of claim 1, wherein the vehicle operates in the second mode of operation when a location of the vehicle cannot be determined with a sufficient degree of precision.

10. The method of claim 9, wherein the sufficient degree of precision is when the location of the vehicle is known to within 10 centimeters.

11. The method of claim 9, wherein the sufficient degree of precision is when the location of the vehicle is known to within 5 centimeters.

12. The method of claim 9, wherein the sufficient degree of precision is when the location of the vehicle is known to within 1 centimeter.

13. The method of claim 1, wherein the system is a suspension system actuator of a suspension system.

14. The method of claim 13, wherein the suspension system is an active suspension system.

15. The method of claim 1, wherein the database is a remote database, wherein the remote database is in the cloud.

16. The method of claim 1, wherein the vehicle operates in the second mode of operation when communication with the database is interrupted for a predetermined period of time.

17. The method of claim 1, wherein, under at least one operating condition the vehicle transitions from operating in the second mode to operating in the first mode.

18. A method of controlling a system, in a vehicle, with a first combination reactive-proactive controller and a second combination reactive-proactive controller, when the vehicle is traveling on a road surface, the method comprising:

in a first mode of operation:

receiving, at a microprocessor, information from a database, about a first portion of the road surface, before arriving at the first portion of the road surface;

operating the first combination reactive-proactive controller in a reactive-proactive mode to formulate a first command, based on the information received from the database, to control the system in a first frequency range; and operating the second combination reactive-proactive controller in a reactive-proactive mode to formulate a second command, based on the information received from the database, to control the system in a second frequency range; and when the vehicle is traveling on the first portion of the road surface, operating controlling the system based on the first command and the second command; and in a second mode of operation:

receiving, at a microprocessor, information about a second portion of the road surface from at least one on-board sensor, when the vehicle is traveling on the second portion of the road surface;

operating the first combination reactive-proactive controller in a reactive-only mode to formulate a third command based on the information from the at least one sensor, to control the system in a third frequency range;

operating the second combination reactive-proactive controller in a reactive-only mode to formulate a fourth command based on the information from the at least one sensor, to control the system in a fourth frequency range; and when the vehicle is traveling on the second portion of the road surface, controlling the system based on the third and fourth commands.

19. The method of claim 18, wherein, under at least one operating condition the vehicle transitions from operating in the first mode to operating in the second mode.

20. The method of claim 19, wherein the first combination reactive-proactive controller and/or the second combination reactive-proactive controller operates according to at least one algorithm running on at least one microprocessor, wherein the at least one algorithm includes at least one parameter, and wherein a value of the at least one parameter is changed during a transition between the first mode and the second mode.

21. The method of claim 20, wherein the value of the at least one parameter is changed from a first value to a second value.

22. The method of claim 21, wherein the change occurs gradually over a period of at least 0.5 seconds but less than 1.5 seconds.

23. The method of claim 22, the change is a linear function of time.

24. The method of claim 21, the first value of the at least one parameter is one and the second value of the at least one parameter is zero.

25. The method of claim 21, wherein first value of the at least one parameter is zero and the second value of the at least one parameter is one.

26. The method of claim 18, wherein the vehicle operates in the second mode of operation when a location of the vehicle cannot be determined with a sufficient degree of precision.

27. The method of claim 26, wherein the sufficient degree of precision is when the location of the vehicle is known to within 10 centimeters.

28. The method of claim 26, wherein the sufficient degree of precision is when the location of the vehicle is known to within 5 centimeters.

29. The method of claim 26, wherein the sufficient degree of precision is when the location of the vehicle is known to within 1 centimeter.

30. The method of claim 18, wherein the system is a suspension system actuator of a suspension system.

31. The method of claim 30, wherein the suspension system is an active suspension system.

32. The method of claim 18, wherein the database is a remote database.

33. The method of claim 32, wherein the remote database is in the cloud.

34. The method of claim 18, wherein the vehicle operates in the second mode of operation when communication with the database is interrupted for a predetermined period of time.

35. The method of claim 18, wherein, under at least one operating condition the vehicle transitions from operating in the second mode to operating in the first mode.

36. The method of claim 20, wherein the at least one parameter is a gain.

37. The method of claim 18, wherein the first frequency range and third frequency range are equal.

38. The method of claim 18, wherein the second frequency range and fourth frequency range are equal.

39. The method of claim 18, wherein the first frequency range and third frequency ranges include frequencies above 0.1 Hz but below 2 Hz and the second frequency range and fourth frequency range include certain frequencies equal to or above 2 Hz but below 20 Hz.

40. The method of claim 18, wherein the system is selected from the group consisting of an active suspension system, a semi-active suspension system, a braking system, and a steering system.

41. The method of claim 18, wherein the first combination reactive-proactive controller and the second combination reactive-proactive controller are implemented as a single combination reactive-proactive controller.

42. The method of claim 18, further comprising:

receiving, at the microprocessor, information about the first portion of the road surface from at least one on-board sensor when the vehicle is traveling on the first portion of the road surface;

operating the first combination reactive-proactive controller in the reactive-proactive mode to formulate the first command based on both the information received from the database and the information received from the at least one on-board sensor, to control the system in the first frequency range; and operating the second combination reactive-proactive controller in the reactive-proactive mode to formulate the second command based on both the information received from the database and the information received from the at least one on-board sensor, to control the system in the second frequency range.

* * * * *